June 26, 1945.  A. BRANDES  2,379,062
STEAM TREATMENT VESSEL
Filed Jan. 7, 1944
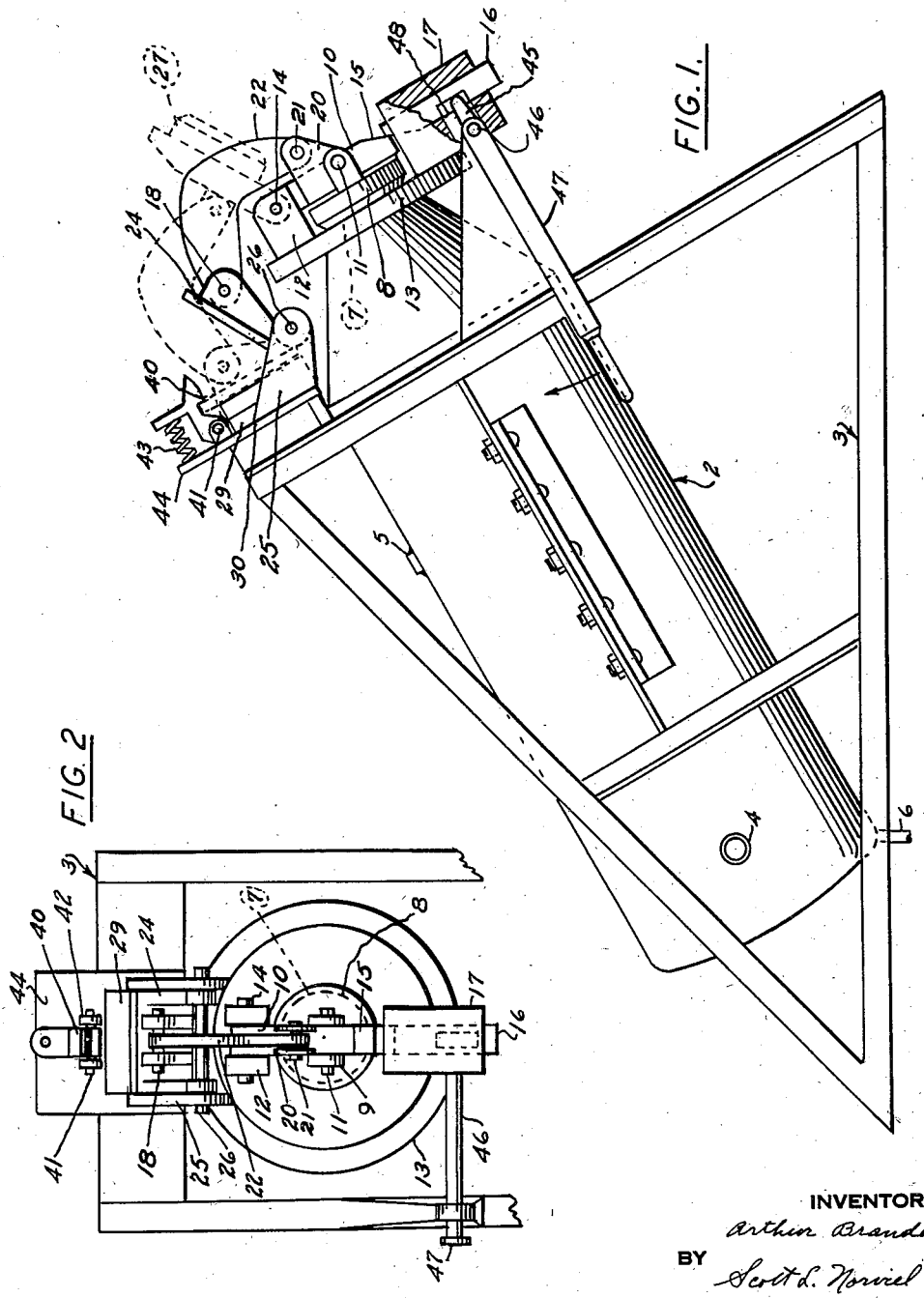
INVENTOR
Arthur Brandes
BY
Scott L. Norviel
ATTORNEY Patented June 26, 1945

2,379,062

UNITED STATES PATENT OFFICE 2,379,062

STEAM TREATMENT VESSEL

Arthur Brandes, Arcadia, Calif., assignor of one-half to R. S. Chapman, Phoenix, Ariz.

Application January 7, 1944, Serial No. 517,345

1 Claim. (Cl. 19—5)

This invention pertains to steam treatment vessels used in the extraction of fiber. More particularly, it has for its objects the provision of a steam treatment vessel, including closing mechanism, adapted for use as part of a pilot plant in the field where maintenance and repair equipment are not available.

Heretofore the extraction of fiber from leaves and the like by the steam expansion method has been confined to comparatively large and massive installations located at central depots to which fiber-bearing plants were hauled. A large part of the fiber treated includes yucca of various species, common to desert areas of the southwest. Since these species are numerous, and the value of fiber contained in the plants varies greatly, and since the various plants are scattered over a vast uninhabited area, it is necessary to survey the areas to be harvested with a light semi portable apparatus which can be easily transported from place to place and which is constructed in the simplest possible manner in order to avoid maintenance and repairs incident to larger apparatus which must necessarily involve hydraulic cylinders, electrical latches, and the like.

I have found that, in the field these various hydraulic mechanisms and electrical connections are impractical, due to the weather conditions and terrain where the pilot plant must operate; and, further, maintenance of such complicated apparatus is impractical in the hands of unskilled workers such as are available in these areas. It is highly advantageous to use apparatus which only uses simple mechanical mechanisms to perform the somewhat exacting functions necessary to the successful extraction and separation of fiber by the method mentioned. To secure satisfactory results the fiber-bearing plants, after steam treatment, must be instantaneously expanded thru an orifice of a properly proportioned size and without constriction which would tumble or tear the fiber. Since the method involves steam pressures running as high as 350 pounds gauge per square inch and the opening areas of as much as 25 square inches, and a steam tight closure that must be instantaneously released, the closing means must be rugged and simple, the opening mechanism likewise, and, still more important, some adequate mechanism must be provided to absorb the shock of the rapidly moving parts immediately after opening.

In view of the foregoing, the objects of my invention are—

First, the provision of an expansion vessel including orifice closing, opening and shock absorbing mechanism combined as a compact unit;

Second, the provision of an orifice closing mechanism combined with an opening and shock absorbing mechanism, so as to be manually operated and mechanical in function;

Third, a mechanical shock absorbing mechanism adapted to translate the high velocity opening movement of an opening door to a low velocity movement so that the released energy may be absorbed by resilient pads; and Fourth, a combined swinging closure, mechanical opening and closing mechanism, velocity reducing structure, and hold open latch adapted for use on a simple apparatus for extraction of fiber by the steam explosion method.

I attain the foregoing objects by means of the structure and devices illustrated in the accompanying drawing in which—

Figure 1 is a side elevational view of my device, and

Figure 2 an axial elevational view of the front end thereof.

Similar numerals refer to similar parts in both views.

Referring to the drawing, 2 indicates a steam treatment vessel, of the type adapted to the expansive separation of fiber from fiber-bearing plants, such as yucca, hemp, ramie and the like. This vessel is supported on a light, but adequately strong, framework 3 of angle iron welded at the several joints, and proportioned so that the axis of vessel 2 is positioned at an angle of from 20 to 30 degrees relative to horizontal. This aids in loading and in the expanding operation.

The vessel is closed, except for a steam inlet pipe 4, a gage tap 5, a drain 6, and the main loading and ejection vent 7.

The main vent is round, proportioned relative to the diameter and volume of vessel 2, according to the best practise of the art, and has its outer edge ground to receive the closing door 8 to secure a steam tight fit.

Door 8 is provided with lugs 9 and loosely pivotally supported on hinge bar 10 by a pin 11, peened at each end.

Lugs 12 on the flanged plate 13 at the open end of vessel 2 afford support for hinge pin 14 to support the hinge bar 10, which has a beveled jam face 15 formed at its outer end.

A closing latch bar 16 slides in a latch frame 17 attached to the lower part of the vessel end plate 13. The upper inner end of latch bar 16 is beveled to match the bevel on the outer face of hinge bar 10. The angles of these bevels are such that when latch 16 is driven in place for closing, as shown, friction will retain it in position against any outward thrust on the door by pressure within the vessel. I have found that about 4 degrees bevel is suitable.

Lugs 20 carried on hinge bar 10 form a hinge connection with pin 21 to the lower end of angle or elbow link 22. The upper end of this link is hinged at 18 to the outer portion of pressure plate 24 which in turn is hinged to lugs 25 by pin 26. The link and its adjoining parts are proportioned so that, as the door swings open to the position indicated by dotted outline 27, the pressure plate is brought in contact with the elastic and resilient pads 29 made of gum rubber and held within the frame 30 which includes the lugs 25 as side members.

I have found that if the door 8 is permitted to swing freely after being released when pressure is in the vessel, the rapid motion and translated energy cannot be stopped by any direct mechanical means such as pads, springs or the like. When freely swung, on opening, the door and its hinge bar crashes with such force as to crush and destroy any available padding such as rubber, felt, or the like, and will break any metal springs or similar devices. Since the nature of the process, here concerned, requires that steam up to pressures of 350 pounds per square inch be instantly released by the opening of the door and since this is backed by many pounds of fiber bearing material a simple shock block as above mentioned is impractical. While hydraulic dash pots might be used, I have found that maintenance of these devices in the field, under the conditions prevailing, including constant exposure to dirt, gums, and heat, is uneconomical and impractical. However, the mechanical linkage here disclosed, reduces the speed produced by the sweep of the door to a handleable speed on the pressure plate; energy is absorbed by the moving parts; the door is free to move quickly, (as it must to secure successful results) and yet the build up of the kinetic energy is prevented so that while the pressure plate may be operated under increased leverage from the door the speed of motion is reduced so that it does not crush or destroy the shock absorbing pads. In other words, while the pressure on the pressure plate may be greater than on the door at an instant after release, yet its striking effect on a pressure pad is well within controllable pressures by pads of the nature shown.

In order to control rebound, and the door from unintentional contact with the seat on the mouth of the vessel, I provide a hold open latch hook 40 pivoted at 41 on lugs 42, attached to plate 44, and held in lowered or engaging position by spring 43. The hook is positioned to engage the top edge of pressure plate 24 in its upper position, just touching but not compressing pads 29.

Release of the latch bar 16 to open door 8 when under pressure is effected by the lever lug 45 pivoted on shaft 46 and operated by opening handle 47. Lug 45 works loosely in notch 48 in latch bar 16. This notch is long enough to permit the latch bar to move outwardly independently of lug 45 and permit its free motion just as the lug bar breaks contact or shears from the lower edge of hinge bar 10. This prevents the force of the opening throw from being forced back into handle 47.

In operation, the door is opened to position 27 where it is retained by the open latching mechanism; a charge is loaded into the vessel 2 and the door released and lowered to closed position; it is then secured in closed position by moving latch bar 16 upward to engage hinge bar 10. The handle 47 may be used, to set this bar; but it is usually necessary to tap the outer end of bar 16 with a hammer to insure adequate seating of door 8. Steam is then introduced into vessel 2, and, after the time desired has elapsed, is shut off and then lever 47 is raised smartly in the direction indicated by the arrow. This releases bar 10 from latch bar 16 and the charge is expanded out of opening 7. The door 8 and its hinge bar swing upward, link 22 transmits the motion to swinging pressure plate 24 which is, in turn, forced against pads 29. On rebound this plate is caught and held in the open position (indicated by dotted outline) by the latch hook 40. The vessel is then in readiness for another charge.

I realize that many variations of the disclosed apparatus may be made, but that these may well include the principles, parts, and spirit of my invention, therefore, I wish to be limited only by the following claim.

I claim:

Apparatus for separating fiber from fiber-bearing plants by the steam expansion method, including a pressure vessel, having a loading and expansion vent, a hinged door closing said vent, a latch for holding said door in closed position, manual mechanism for releasing said latch, and mechanism for absorbing the shock of opening under pressure, including a hinged pressure plate, a compression pad operably associated with said pressure plate, a link operably connecting said door and said pressure plate, pivotally attached at one end to said door at a point near its hinged support and pivotally attached at its other end to said pressure plate at a point removed from its supporting hinge by a distance greater than its point of attachment from said door hinge, together with latch mechanism adapted to releasably hold said door in opened position after said pressure plate engages said pressure pad.

ARTHUR BRANDES.